(12) United States Patent
Cai et al.

(10) Patent No.: US 9,142,827 B2
(45) Date of Patent: Sep. 22, 2015

(54) RECHARGEABLE BATTERY HAVING DESIRABLE SAFETY PERFORMANCE

(71) Applicant: Ningde Amperex Technology Limited, NingDe (CN)

(72) Inventors: Ru lai Cai, NingDe (CN); Quan kun Li, NingDe (CN); Ping hua Deng, NingDe (CN); Peng Wang, NingDe (CN)

(73) Assignee: Ningde Amperex Technology Limited, NingDe (CN)

( * ) Notice: Subject to any disclaimer, the term of this patent is extended or adjusted under 35 U.S.C. 154(b) by 148 days.

(21) Appl. No.: 14/158,506

(22) Filed: Jan. 17, 2014

(65) Prior Publication Data

US 2014/0205872 A1 Jul. 24, 2014

(30) Foreign Application Priority Data

Jan. 21, 2013 (CN) .......................... 2013 2 0028704

(51) Int. Cl.
*H01M 2/34* (2006.01)

(52) U.S. Cl.
CPC .................................... *H01M 2/345* (2013.01)

(58) Field of Classification Search
CPC ........................... H01M 2/1229; H01M 2/345
See application file for complete search history.

*Primary Examiner* — Helen O Conley
(74) *Attorney, Agent, or Firm* — Alston & Bird LLP

(57) ABSTRACT

The present application provides a rechargeable battery including a battery case and a battery cap coupled to the battery case. The battery cap includes a conductive cap plate; a first electrode electrically connected to the cap plate; a second electrode insulatively connected to the cap plate, the second electrode being in electrical connection with one end of a conductive plate for securing the second electrode to the conductive cap plate; and a conductive turnover component in electrical connection with the conductive cap plate, the turnover component being initially separated from the conductive plate and capable deforming to contact other end of the conductive plate due to high pressure in the battery case, so as to short-circuit the first electrode and the second electrode.

11 Claims, 5 Drawing Sheets

RECHARGEABLE BATTERY HAVING DESIRABLE SAFETY PERFORMANCE

CROSS-REFERENCE TO RELATED APPLICATION

The present patent application claims priority to Chinese Patent Application No. CN 201320028704.0 filed Jan. 21, 2013, which is incorporated by reference herein in its entirety.

FIELD OF THE INVENTION

The present invention generally relates to rechargeable batteries and, more particularly, relates to a rechargeable battery which has desirable safety performance.

BACKGROUND OF THE INVENTION

With rapid development of technology and people's awareness of environmental protection, rechargeable batteries are becoming increasingly popular as power sources in various devices, for instance, mobile phones, laptop computers, power tools and electric automobiles.

Electric automobiles and energy storage power stations generally need high capacity rechargeable batteries as power sources. In addition to high capacity, generally, a rechargeable battery should also have excellent safety performance and long cycle service life, so as to meet different requirements of actual use.

To ensure safety performance of a rechargeable battery, a rechargeable battery is generally provided with a pressure relief valve. When accident occurs due to improper charging, short circuit or exposure to high temperature, high-energy rechargeable battery will produce a lot of gas and a sharp rise in temperature. The high pressure gas opens the pressure relief valve to achieve the purpose of pressure relief Although the arrangement of the pressure relief valve can improve the safety performance of a rechargeable battery, the energy accumulated in a rechargeable battery with accident itself cannot be released. Therefore, the battery itself is a security risk. If the battery is continued to be overcharged after accidents, it will lead to serious safety accidents.

What is needed, therefore, is to provide a rechargeable battery having desirable safety performance.

SUMMARY OF THE INVENTION

One object of the present invention is to provide a rechargeable battery which has desirable safety performance.

According to one embodiment of the present invention, a rechargeable battery which has desirable safety performance is provided. The rechargeable battery includes a battery case and a battery cap coupled to the battery case. The battery cap includes a conductive cap plate; a first electrode electrically connected to the cap plate; a second electrode insulatively assembled to the cap plate via an insulating component, the second electrode being in electrical connection with one end of a conductive plate for securing the second electrode to the can plate; and a conductive turnover component in electrical connection with the cap plate, the turnover component being initially separated from the conductive plate and capable deforming to contact other end of the conductive plate due to high pressure in the battery case, so as to short-circuit the first electrode and the second electrode.

According to one aspect of the present invention, the turnover component comprises a turnover portion electrically connected with the cap plate and an overcurrent portion electrically connected with the overcurrent portion, the insulative component is formed with a snap ring gasket for matting with the overcurrent portion.

According to one aspect of the present invention, the snap ring gasket is provided with a snap joint portion, the overcurrent portion of the turnover component is provided with a first groove and a second groove below the first groove, the snap joint portion is snapped into the first groove when the turnover component is not turned and snapped into the second groove when the turnover component is turned due to high pressure in the battery case.

According to one aspect of the present invention, the snap joint portion of the snap ring gasket is configured to have a U shape, an S shape or an E shape.

According to one aspect of the present invention, the overcurrent portion and the turnover portion are both made from conductive material.

According to one aspect of the present invention, the overcurrent portion has a column shape and the turnover portion has a ring shape, inner edge of the turnover portion is recessed downwardly to form an elastic structure, and outer edge of the turnover portion is electrically connected with the cap plate.

According to one aspect of the present invention, outer surface of the turnover component is provided with a treatment layer made from a group consisting of brass, bronze, nickel, silver and gold.

According to one aspect of the present invention, the distance between the overcurrent portion of the turnover component and the conductive plate is 0.5~1.0 mm when the overcurrent portion is not turned, and the overcurrent portion of the turnover component is in planar contact with the conductive plate when the overcurrent portion is turned.

According to one aspect of the present invention, the thickness of the turnover portion is 0.1~0.4 times of that of the overcurrent portion.

According to one aspect of the present invention, the overcurrent portion has a thickness of about 0.8~1.5 mm and turning portion has a thickness of about 0.1~0.3 mm According to one aspect of the present invention, the overcurrent portion has a thickness no less than that of the conductive plate and larger than that of the turnover portion.

When the rechargeable battery is in normal condition, the conductive plate and the overcurrent portion of the turnover component does not contact with each other. When the internal pressure reaches the turning pressure of the turnover component due to accident, the turnover portion of the turnover component overturns. The overcurrent portion moves upwardly under the action of turnover portion, so that the conductive plate is electrically connected with the overcurrent portion. In addition, while the turnover component is turning, the snap joint portion of the ring snap gasket disengages with the first groove and sticks into the second groove of the overcurrent portion. In this case, the first electrode and the second electrode are short-circuited, thereby releasing the internal energy of accidental rechargeable battery. Due to the engagement of the snap ring gasket and the second groove, the conductive plate contacts the top surface of the overcurrent portion to form a planar contact. In addition, the overcurrent portion of the turnover component has a certain thickness, which can ensure that the turnover component will not be melted through and guarantee that the external circuit of the rechargeable battery remains conductive. In this way, the overcurrent can be exhausted and the energy inside the rechargeable battery can be released, thereby eliminating safety hazards, ensuring safety performance of the battery even in unexpected situations, and avoiding safety accidents.

Other advantages and novel features will be drawn from the following detailed description of preferred embodiment with the attached drawings, in which:

DETAILED DESCRIPTION OF THE INVENTION

Figure 1:
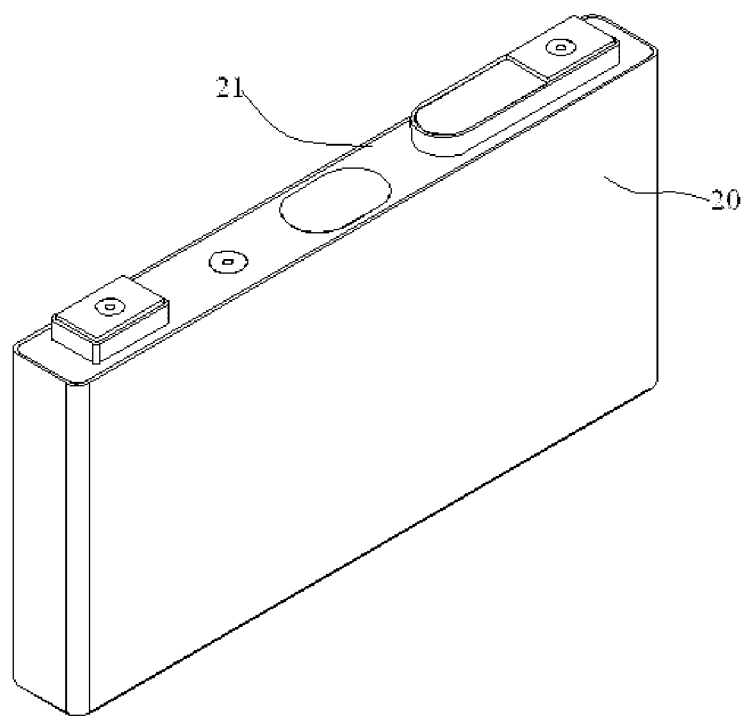
FIG. 1 is a schematic perspective view of a rechargeable battery according to one embodiment of the present invention.
Figure 2:
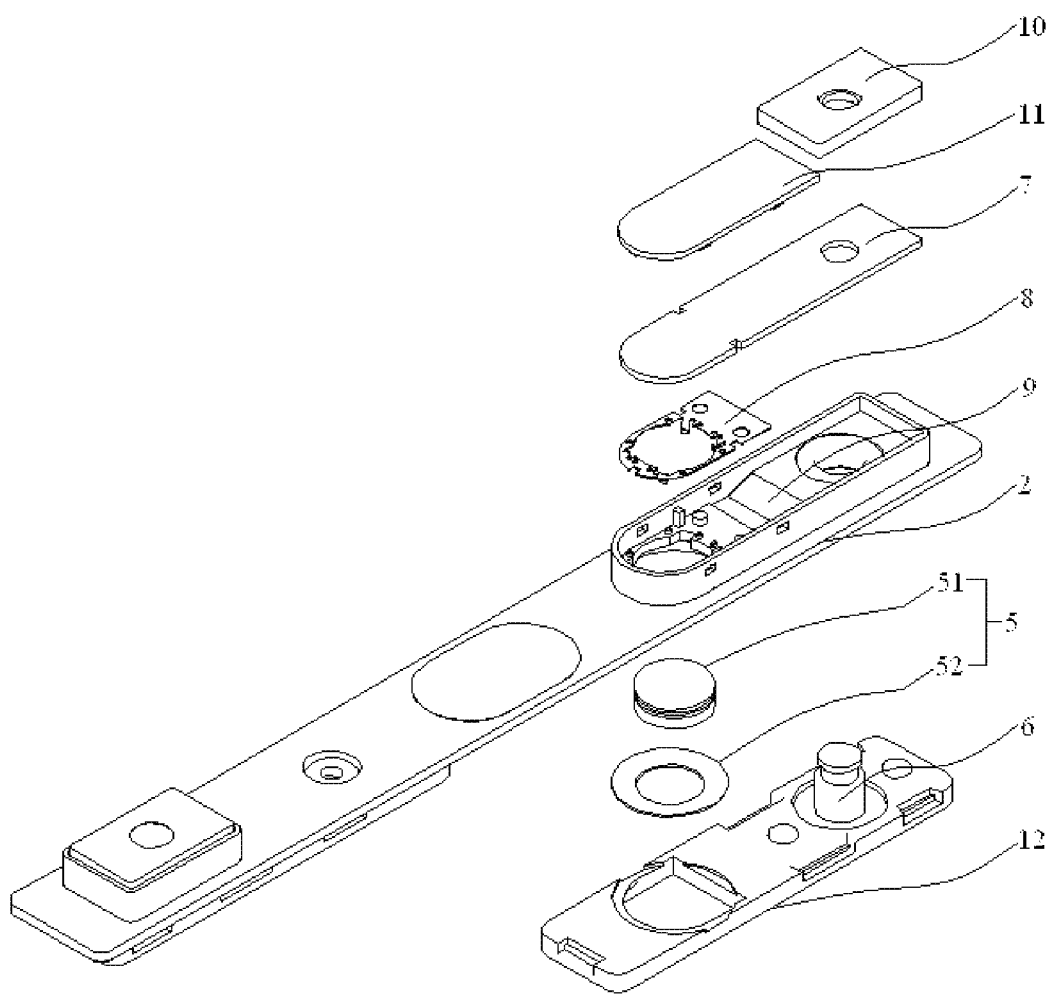
FIG. 2 is a schematic exploded perspective view of a battery cap for use in the rechargeable battery as show in FIG. 1.
Figure 3:
FIG. 3 is a schematic front view of the battery cap in FIG. 2.
Figure 4:
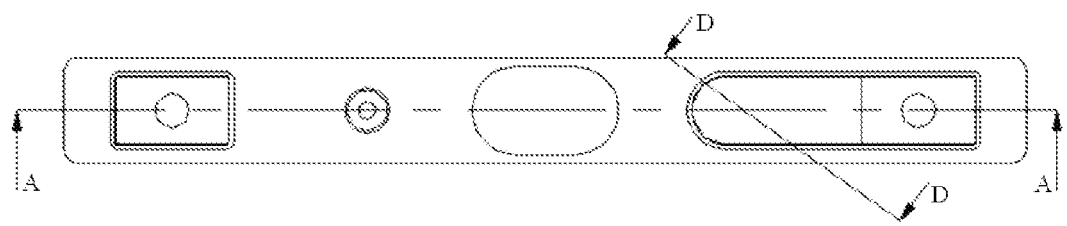
FIG. 4 is a schematic top view of the battery cap in FIG. 3.
Figure 5:
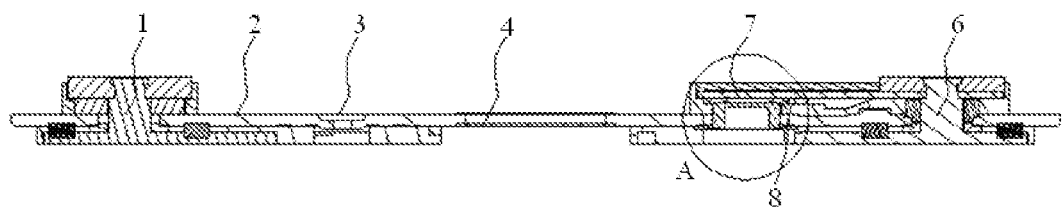
FIG. 5 is a schematic cross-sectional view of the battery cap shown in FIG. 4 along the line A-A.
Figure 6:
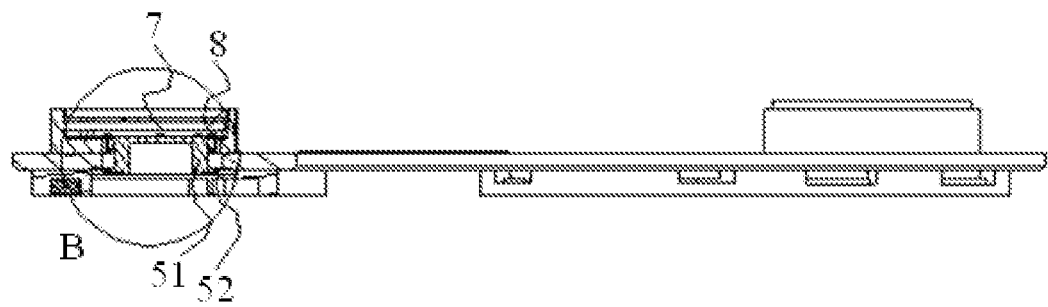
FIG. 6 is a schematic cross-sectional view of the battery cap shown in FIG. 4 along the line D-D.

Referring to FIG. 1, a rechargeable battery according to one embodiment of the present invention includes a battery case 20 and a battery cap 21 provided on the battery case 20 for sealing the battery case 20.

Referring to FIG. 2 to FIG. 6, the battery cap 21 includes a conductive cap plate 2 defining an electrolyte injection hole 3 and formed with a pressure relief valve 4, a first electrode 1 electrically connected to the cap plate 2, a second electrode 6 coupled to the cap plate 2 insulatively and in electrical connection with one end of a conductive plate 7 for securing the second electrode 6 to the cap plate 2, and a conductive turnover component 5 in electrical connection with the cap plate 2. The turnover component 5 is initially separated from the conductive plate 7 and capable deforming to contact the other end of the conductive plate 7 due to high pressure in the battery case 20, to short-circuit the first electrode 1 and the second electrode 6.

The first electrode 1 is electrically connected to the cap plate 2 via welding or riveting. The second electrode 6 is arranged on the cap plate 2 in an insulation manner through an injection molded insulative piece 9 and a lower insulative plastic piece 12. A conductive component 10 is electrically connected to the second electrode 6 for securing the second electrode 6 in position. According to one embodiment of the present invention, the conductive component 10 is preferably made from aluminum. The conductive plate 7 is provided between the conductive component 10 and the second electrode 6. One end of the conductive plate 7 is electrically connected to the second electrode 6 via welding, riveting, screwing or bonding The other end of the conductive plate 7 is parallel to the cap plate 2 and extends away from the second electrode 6 toward the first electrode 1. An insulative upper plastic lid cover 11 is disposed on the conductive plate 7 and adjacent to conductive component 10.

Figure 7:
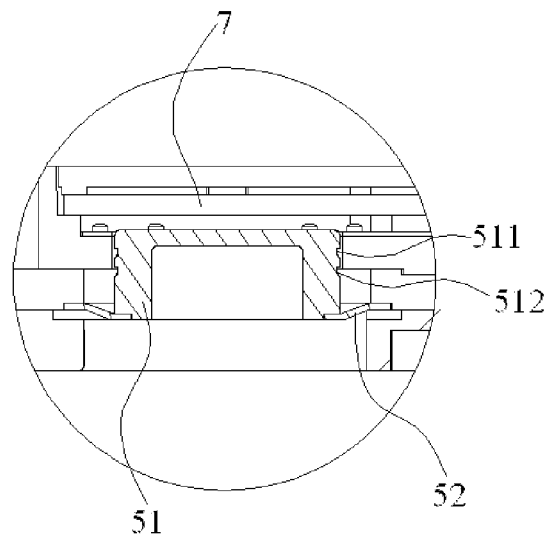
FIG. 7 is a schematic partial enlarged view of the circled part A in FIG. 5.
Figure 8:
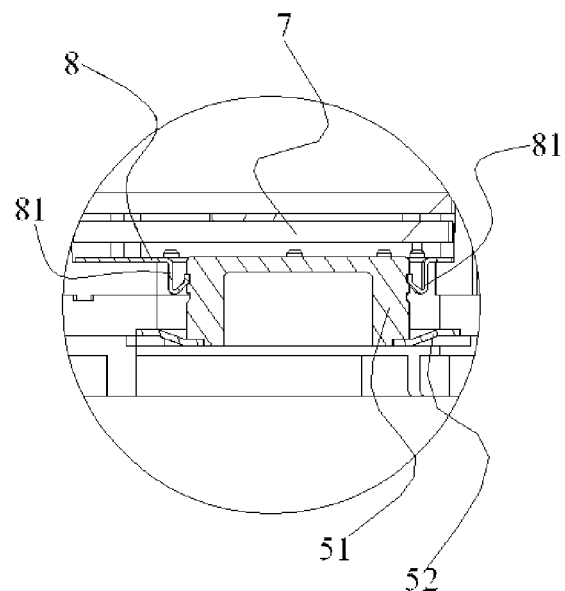
FIG. 8 is a schematic partial enlarged view of the circled part B in FIG. 6.

A snap ring gasket 8 provided with a snap joint portion 81 (as shown in FIG. 8) is fixed on the insulative piece 9. The snap ring gasket 8 can be fixed to the insulative piece 9 via secondary molding or compression molding. Referring to FIG. 7 to FIG. 8, the snap ring gasket 8 is disposed adjacent to the second electrode 6. The snap joint portion 81 can be configured to have a U shape, an S shape or an E shape.

Figure 9:
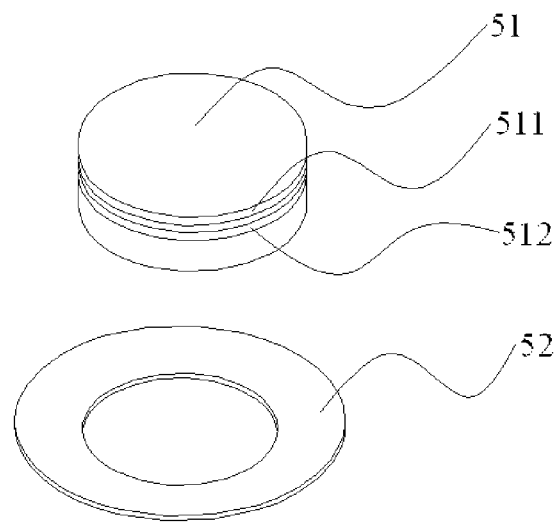
FIG. 9 is a schematic enlarged view of a turnover component shown in FIG. 2.

The turnover component 5 is in electrical connection with a lower surface of the cap plate 2. Referring to FIG. 9, the turnover component 5 includes an overcurrent portion 51 and a turnover portion 52. The overcurrent portion 51 may be a hollow column or a solid column. The turnover portion 52 has a ring shape. Inner edge of the turnover portion 52 is recessed downwardly to form an elastic structure, and outer edge of the turnover portion 52 is electrically connected with the cap plate 2 by welding. According to one embodiment of the present invention, the outer edge may be sealed and connected to the cap plate 2 by laser beam welding, filler brazing, etc. The material of the turnover portion 52 and the overcurrent portion 51 is preferably aluminum, magnesium, copper, stainless steel and other materials having excellent conductivity. The turnover portion 52 and the overcurrent portion 51 can be integrally molded, or can be coupled to each other via welding or riveting. Preferably, the overcurrent portion 51 and the turnover portion 52 are coupled to each other, wherein the overcurrent portion 51 uses a conductive material with a high melting point, and the turnover portion 52 uses a soft conductive material which is easy to be melded with the overcurrent portion 51, preferably aluminum. The turnover portion 52 and the overcurrent portion 51 coupled to each other may be made from same or different material. The surface of the turnover component 5 may be coated with a surface treatment layer, so as to increase the conduction capability of the turnover component 5, thereby making the heating value and temperature-rise lower than that of the conductive plate 7 and the heat-releasing capability better than that of the conductive plate 7. The material of the treatment layer can be selected from a group consisting of brass, bronze, silver, gold and nickel. According to one preferable embodiment of the present invention, the material of the treatment layer is nickel. The surface treatment layer can be formed on the turnover component 5 via sputtering or electroplating.

Referring to FIG. 7 and FIG. 8, outer surface of the overcurrent portion 51 is provided with a first groove 511 and a second groove 512 below the first groove 511 for matching with the snap ring gasket 8. In one embodiment of the present invention, the thickness of the overcurrent portion 51 is no less than that of the conductive plate 7, so that the turnover component 5 and the conductive plate 7 can withstand impact of large current and do not be damaged in discharging. The thickness of the overcurrent portion 51 is greater than that of the turnover portion 52. Preferably, the thickness of the turnover portion 52 is 0.1~0.4 times of that of the overcurrent portion 51. Most preferably, the thickness of the overcurrent portion 51 is 0.8~1.5 mm, while the thickness of the turnover portion 52 is 0.1~0.3 mm.

Referring to FIG. 5 to FIG. 9, in assembly, the conductive plate 7 is initially separated from the turnover component 5. When the turnover component 5 is not turned, the snap joint portion 81 of the snap ring gasket 8 is matched with the first groove 511 of the overcurrent portion 51 defined in the turnover component 5. The conductive plate 7 is separated from the overcurrent portion 51. The distance between the conductive plate 7 and the overcurrent portion 51 is preferably 0.5-1.0 mm. In use, the turning air pressure of the turnover component 5 is 0.3-0.5 MPa. The turning height of the turnover component 5 is no less than the distance between the conductive plate 7 and the overcurrent portion 51 before the turnover component 5 is turned. According to one preferred embodiment of the present invention, the turning height is no less than 1.0 mm. To ensure safety, the turnover component 5 is configured to not break at a pressure of 0.7 MPa due to excessive pressure. A distance between the two grooves of overcurrent portion 51 is no less than the distance between the conductive plate 7 and the overcurrent portion 51 prior to the turnover component 5 is turned, and no greater than the turning height of the turnover portion 52.

When the rechargeable battery is in normal condition, the conductive plate 7 and the overcurrent portion 51 of the turnover component 5 does not contact with each other. When accident occurs, pressure in the battery case 20 rises. When the internal pressure reaches the turning pressure of the turnover component 5, the turnover portion 52 of the turnover component 5 overturns. The overcurrent portion 51 moves upwardly under the action of turnover portion 52 to a distance equal to the turning height of the turnover portion 52, which is no less than the distance between the conductive plate 7 and the overcurrent portion 51, so that the conductive plate 7 is electrically connected with the overcurrent portion 51. In addition, while the turnover component 5 is turning, the snap joint portion 81 of the ring snap gasket 8 disengages with the first groove 511 and sticks into the second groove 512 of the overcurrent portion 51. In this case, the first electrode 1 and the second electrode 6 are short-circuited, thereby releasing the internal energy of accidental rechargeable battery. With the engagement of the snap ring gasket 8 and the second groove 512, the conductive plate 7 contacts with the top surface of the overcurrent portion 51 to form a planar contact. In addition, the overcurrent portion 51 of the turnover component 5 has a certain thickness, which can ensure that the turnover component 5 will not be melted through and guarantee that the external circuit of the battery remains conductive. In this way, the overcurrent can be exhausted and the energy inside the battery can be released, thereby eliminating safety hazards, ensuring the safety performance of the rechargeable battery even in unexpected situations, and avoiding safety accidents.

While the present invention has been illustrated by the above description of the preferred embodiment thereof, while the preferred embodiment has been described in considerable detail, it is not intended to restrict or in any way limit the scope of the appended claims to such details. Additional advantages and modifications within the spirit and scope of the present invention will readily appear to those ordinary skilled in the art. Consequently, the present invention is not limited to the specific details and the illustrative examples as shown and described.

What is claimed is:

1. A rechargeable battery comprising a battery case and a battery cap coupled to the battery case, the battery cap comprising:
   a conductive cap plate;
   a first electrode electrically connected to the cap plate;
   a second electrode insulatively coupled to the cap plate via an insulative component, the second electrode being in electrical connection with one end of a conductive plate for securing the second electrode to the conductive can plate; and
   a conductive turnover component in electrical connection with the cap plate, the turnover component being initially separated from the conductive plate and capable deforming to contact other end of the conductive plate due to high pressure in the battery case, so as to short-circuit the first electrode and the second electrode.

2. The rechargeable battery according to claim 1, wherein the turnover component comprises a turnover portion electrically connected with the cap plate and an overcurrent portion electrically connected with the overcurrent portion, the insulative component is formed with a snap ring gasket for matting with the overcurrent portion.

3. The rechargeable battery according to claim 2, wherein the snap ring gasket is provided with a snap joint portion, the overcurrent portion of the turnover component is provided with a first groove and a second groove below the first groove, the snap joint portion is snapped into the first groove when the turnover component is not turned and snapped into the second groove when the turnover component is turned due to high pressure in the battery case.

4. The rechargeable battery according to claim 3, wherein the snap joint portion of the snap ring gasket is configured to have a U shape, an S shape or an E shape.

5. The rechargeable battery according to claim 2, wherein the overcurrent portion and the turnover portion are both made from conductive material.

6. The rechargeable battery according to claim 2, wherein the overcurrent portion has a column shape and the turnover portion has a ring shape, inner edge of the turnover portion is recessed downwardly to form an elastic structure, and outer edge of the turnover portion is electrically connected with the cap plate.

7. The rechargeable battery according to claim 6, wherein outer surface of the turnover component is provided with a treatment layer made from a group consisting of brass, bronze, nickel, silver and gold.

8. The rechargeable battery according to claim 6, wherein the distance between the overcurrent portion of the turnover component and the conductive plate is 0.5~1.0 mm when the overcurrent portion is not turned, and the overcurrent portion of the turnover component is in planar contact with the conductive plate when the overcurrent portion is turned.

9. The rechargeable battery according to claim 6, wherein the thickness of the turnover portion is 0.1~0.4 times of that of the overcurrent portion.

10. The rechargeable battery according to claim 9, wherein the overcurrent portion has a thickness of about 0.8~1.5 mm and the turnover portion has a thickness of about 0.1~0.3 mm.

11. The rechargeable battery according to claim 6, wherein the overcurrent portion has a thickness no less than that of the conductive plate and larger than that of the turnover portion.

* * * * *